Sept. 19, 1961  L. D. FRIEL  3,000,212
LIQUID LEVEL SENSOR
Filed Nov. 4, 1955
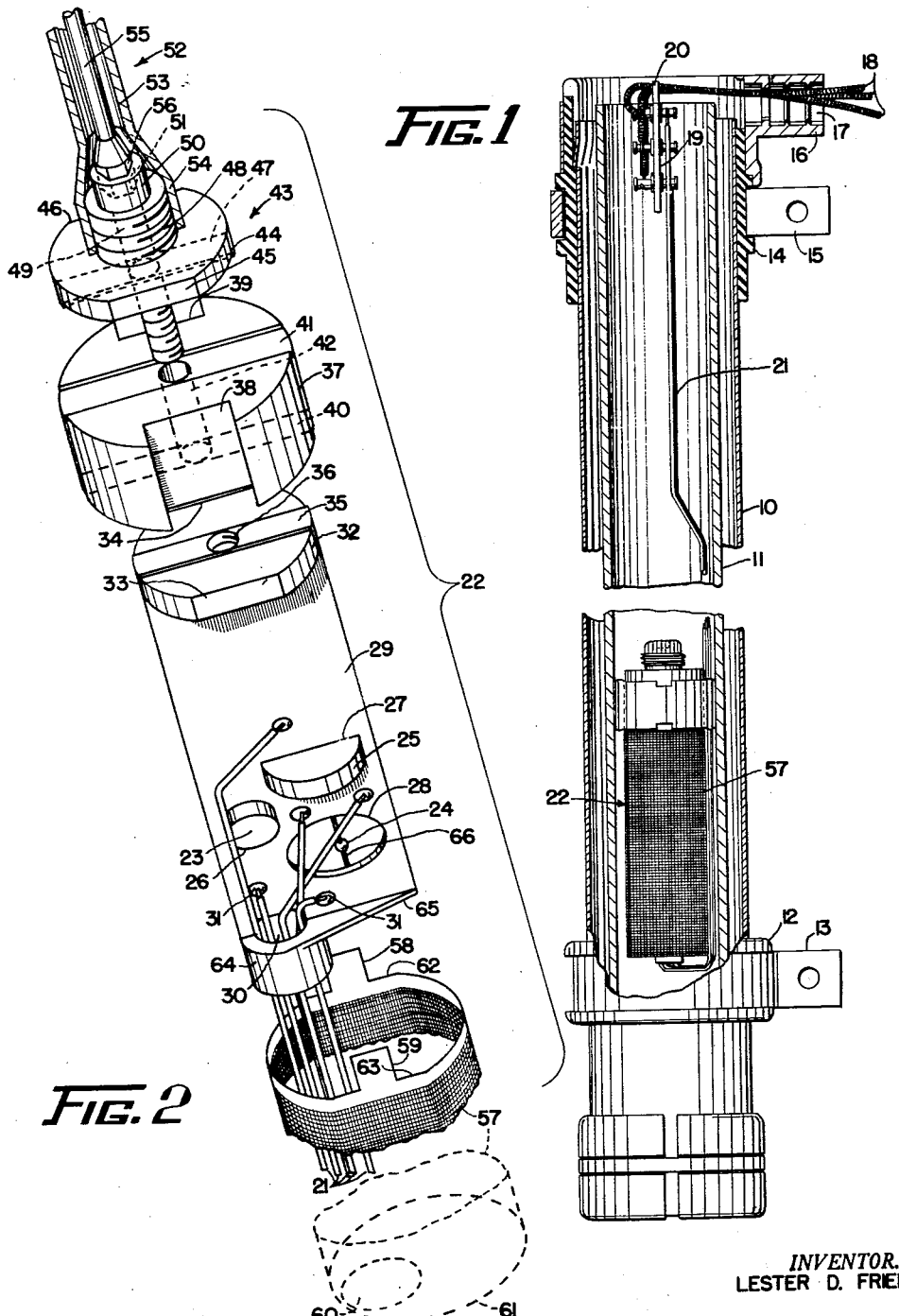
INVENTOR.
LESTER D. FRIEL
BY *Francis A. Sirr*
ATTORNEY

United States Patent Office 3,000,212
Patented Sept. 19, 1961

3,000,212
LIQUID LEVEL SENSOR
Lester D. Friel, Minneapolis, Minn., assignor to Minneapolis-Honeywell Regulator Company, Minneapolis, Minn., a corporation of Delaware
Filed Nov. 4, 1955, Ser. No. 544,888
5 Claims. (Cl. 73—304)

This invention relates to improvement in the mounting arrangements for liquid level sensors, such that the liquid level sensor is easily accessible for repair and maintenance, is easily manipulated to place it at the proper location, and is protected against mechanical damage due to liquid sloshing and the like.

Usually, in aircraft fuel level applications, a liquid level sensor is placed and positioned on a member of the aircraft, such as a wing spar, or the liquid level sensor is attached to the outer surface of the outer electrode of a cylindrical, capacitive probe of a fuel gage. Placing the liquid level sensor on a portion of the aircraft requires the provision of an extra handhole to locate and position the liquid level sensor, and this of course requires extra fabrication, and further, reduces the strength of that portion of the structure where the handhole is located. The arrangement wherein the liquid level sensor is located on the outer surface of the fuel probe does not lend itself favorably to the concept of repositioning and removing the liquid level sensor without withdrawing the fuel probe.

The present disclosure shows an arrangement wherein a liquid level sensor can be variably positioned within the inner electrode of a cylindrical, capacitive probe of a liquid gage, and wherein the mounting means dispenses with the usual screw fasteners and utilizes friction to maintain the liquid level sensor in the desired position. Further, the arrangement allows the liquid level sensor to be removed from the liquid probe for maintenance and repair without removing the liquid probe proper or requiring a handhole space larger than that required for the liquid probe.

It is an object of this invention to provide a liquid level sensor arrangement wherein the liquid level sensor can be positioned from exterior of the space wherein it is located.

It is another object of this invention to provide a liquid level sensor arrangement wherein the liquid level sensor can be variably positioned within a probe extending into the liquid container.

It is a further object of this invention to provide a liquid level sensor arrangement that eliminates the need for larger handholes than that required for the liquid probe, or for requiring extra handholes.

It is a still further object of this invention to provide a liquid level sensor arrangement wherein the liquid level sensor is protected from mechanical damage due to sloshing fluid.

These and other objects will become apparent for reading of the following specifications and appended claims in which:

FIGURE 1 shows a capacitive type fuel prove having a liquid level sensor positioned in the inner electrode thereof, and FIGURE 2 shows an exploded view of the liquid level sensor and the positioning means therefor.

In FIGURE 1, a capacitive type fuel probe of a fuel gage is comprised of an outer electrode 10 and an inner electrode 11 separated from each other by separator insulators, not shown. The outer electrode 10 and the inner electrode 11 are suitably electrically connected to gage the level of the fluid within the container wherein the fuel probe is placed, but for reasons of clarity these connections have been omitted. Insulator ring 12 is securely fastened to the outer surface of the outer electrode 10 and has provision for accommodating a strap 13 which is used to fasten the fuel probe to an appropriate aircraft member in a fuel tank, both not shown. At the upper portion of the fuel probe, insulator ring 14 is securely fastened to the outer surface of the outer electrode 10, and this ring also has provision for a strap 15, which strap is utilized to fasten the fuel probe to an appropriate aircraft member in a fuel tank, both not shown. Rigidly attached to the insulator ring 14 is a housing 16 which has an opening 17 for the introduction of the fuel gage lead wires, not shown, and the liquid level sensor lead wires 18. A terminal card 19, which is made of an insulating material, is located within the inner electrode 11 with which it has a sliding fit. The terminal card 19 has an upper portion 20 which is of greater dimension than the main body of the terminal card and also of a greater dimension than the inside diameter of inner electrode 10 and it is this position which determines the extent to which the terminal card 19 extends within the inner electrode 11. The liquid level sensor lead wires 18 are connected to the terminals on one side of the terminal card 19. Lead wires 21, are attached to the terminals on the opposite side of the card and are further attached to the proper element of a liquid level sensor 22.

The liquid level sensor 22 is more clearly shown in the exploded view of FIGURE 2. The liquid level sensor of this embodiment is of the thermistor type, although it is recognized that other type arrangements may be used. A reference thermistor 23 and a compensating thermistor 25 are secured in openings 26 and 27 of a card 29 made of an insulating material. A measuring thermistor 24 is located in the opening 28 by means of a wire 66 which forms a part of the liquid level circuit located on the back surface of card 29. Lead wires 21 pass through opening 60 located in the bottom portion 61 of a screen closure 57 and opening 30 provided in the card 29. Openings 31 provided in card 29 are filled with solder with the end portions of lead wires of 21 in place. At the same time that the end portions of lead wires 21 are soldered in place, conductors, not shown, are cross connected on the back side of the card 29 to provide the proper electrical circuit for a liquid level sensor arrangement such as shown in the co-pending application of Donald C. Johnston, Serial No. 459,702, filed October 1, 1954. A shoulder portion 32 is formed at the upper portion of the card 29. The shoulder portion 32 is essentially cylindrical in shape with the exception that it has flattened portions 33 and 34 located 180 degrees apart. A raised portion 35 is located on the upper surface of the shoulder portion 32, and through this raised portion 35 and the shoulder portion 32, a threaded opening 36 is located.

Located above the card 29 is an expanding member 37, which is formed of a rubber-like material, having a diameter greater than shoulder 32, but slightly less than the inside diameter of the inner electrode 11, and having a substantially cylindrical shape with the exception that notches or grooves 38 and 39 are located 180 degrees apart. A groove 40, a bit wider than the ridge 35 of the card 29, extends across expanding member 37. A groove 41 is located on the upper surface of the expanding member 37. An opening 42, somewhat larger than the threaded opening 36 of the card 29, passes through the upper and lower surfaces of expanding member 37.

Member 43 is comprised of a substantially cylindrical portion 44 having a diameter less than expanding member 37 and having flattened portions 45 and 46 located 180 degrees apart. Ridge 47, which is a bit narrower than the groove 41 of the expandable member 37, is located on the bottom surface of the cylindrical portion 44. A threaded portion 48 is located on the upper portion of member 43, and extending through both the threaded portion 48 and cylindrical portion 44 is an opening 49 which is somewhat larger than the threaded opening 36 of the card 29. Screw fastener 50 which fits freely in openings 42 and 49 and which threads the complementary threaded opening 36 has a hex opening 51 in its head.

Tool 52 is comprised of member 53 which has a portion 54 which engages the threaded portion 48 of member 43 and further comprised of member 55 which has a hex portion 56 which fits in the hex opening 51 of the screw fastener 50. The operation and function of the tool 52 will be described below. Adapted to cover and enclose the thermistor card is the spark arresting screen closure 57 which is provided with the extending tabs 58 and 59 and with flattened sides 62 and 63 spaced 180 degrees from each other.

At this point is should be noted that the distances across the flattened portions of members 32, 37, 43, and 57 are all approximately the same. Further, it should be noted that the grooves and ridges of members 32, 37, and 43 are all placed in identical relationship with regard to the flattened portion each possesses.

The liquid level sensor is assembled in the following manner:

The screen closure 57 is passed over the card 29, with the flattened sides 62 and 63 of the screen closure in line with the flattened portions 33 and 34 of shoulder 32, so that portion 64 passes through opening 60 and the bottom surface 65 of card 29 rests on the interior surface of the bottom portion 61 of the screen closure 57. The screen closure 57 is of such a length that with card 29 in place, it terminates in line with the upper surface of 32 around which the screen closure closely fits. The extended tabs 58 and 59 of the screen 57 are bent inwardly and over so that they lie against the upper surface of the shoulder 32. Next, the expandable member 37 is positioned on the shoulder 32 of the card 29, making prisoners of tabs 58 and 59 thereby securing the screen closure 57 in place, so that the groove 40 mates with the ridge 35 of the card 29. Member 43 is then placed on the upper surface of expanding member 37 with the ridge 44 placed within the groove 41 of the expanding member 37. The ridge and groove arrangements of members 32, 37, and 43 guard against relative rotation between the forementioned members when assembled. Expanding member 37 and member 43 are positioned with relation to the shoulder 32 so that the opening 49 in the member 43 and the opening 42 in the expanding member 37 are in line with the thread opening 36 of the shoulder 32 of the card 29. The screw fastener 50 is passed through the opening 49, the opening 42, and engaged with the thread opening 36 and then tightened to form a loose connection between the card 29, the expanding member 37, and the member 43. All this is done without the benefit of the tool 52.

As shown in FIGURE 1, the liquid level sensor 22 is located within the inner electrode 11, and is held in place by the friction fit developed between the periphery of the expandable member 37 and the inner surface of the inner electrode 11, as will be explained below. The lead wires 21 extending from the liquid level sensor 22 are brought up past the sensor, through the passage formed between the flattened portions of 57, 37, and 43 and the inner surface of 11.

To locate, reposition, or remove the liquid level sensor in or from the fuel probe, the tool 52 is utilized. Thus, to reposition the liquid level sensor 22 within the inner electrode 11 of the fuel probe, as shown in FIGURE 1, the terminal card 19 is removed, there being enough slack in the lead wires 21 to accomplish this. The tool 52 is then inserted into the inner electrode 11 and positioned above the liquid level sensor 22 with member 55 pulled upward from member 53. Portion 54 of member 53 is caused to fully engage the threaded portion 48 of member 43. The hex portion 56 of member 55 is then caused to be placed in the hex opening 51 of screw fastening 50. The member 55 is rotated so as to loosen the screw fastening 50 from the threaded opening 36, thereby allowing the expandable member 37 to assume its natural shape, thus breaking the friction fit set up between the periphery of the expandable member 37 and the interior surface of the inner electrode 11. Then by raising or lowering the tool 52 the liquid level sensor 22 can be repositioned at any desired level. When the desired location has been obtained, member 55 is rotated causing the screw fastener 50 to further engage the threaded opening 36, thereby bringing a pressure to bear on the expandable member 37. Upon sufficient rotation of the member 55, the expandable member 37 will have been expanded to such a degree as to form a friction fit between it and the inner surface of inner electrode 11. The member 55 is then moved upwardly to disengage hex portion 56 from the hex opening 51 of screw fastening 50 and the member 53 is rotated so that it is disengaged from the threaded portion 48 of member 43. Both members 53 and 55 of tool 52 are withdrawn from the fuel probe, and the terminal card 19 is reinserted into the inner electrode 11. A similar procedure is followed for locating or removing the liquid level sensor 22. By maintaining the proper clearance at the upper extremity of the inner electrode, the liquid level sensor can be inserted or withdrawn from the inner electrode without withdrawing the fuel probe from the container wherein the fuel probe is located.

From the above it can be appreciated that a new and novel method of liquid level sensor arrangement has been introduced. Thus, it can be seen that the liquid level sensor can be located or repositioned at any point within the probe as desired, that the liquid level sensor can be removed from the fuel probe without disturbing the fuel probe, and, further, that the above described method eliminates the need for larger or extra handhole openings for servicing such liquid level sensors. It is recognized that there are other embodiments of the invention and therefore the scope of the invention should be determined by the appended claims.

I claim:

1. In liquid gaging apparatus, a combination comprising a capacitive probe liquid quantity measuring means having an inner and an outer cylindrical electrode, liquid level sensor means adapted to be located at any position within the inner electrode of said probe measuring means, holding means for said liquid level sensor means operatively connected to said liquid level sensor means and movable therewith, said holding means comprising a resilient member and another member, the latter member arranged to bring a force to bear on the former member to cause peripheral expansion of said resilient member and to thereby provide a friction fit between the resilient member and the interior surface of the inner electrode of said probe measuring means.

2. In liquid gaging apparatus, the combination comprising a capacitive probe liquid quantity measuring means having an inner and an outer cylindrical electrode, liquid level sensor means adapted to be located at any position within the inner electrode of said probe measuring means, positioning means for said level sensor means operatively connected to said liquid level sensor means and movable therewith, said positioning means comprising a rubber-like expansion member having an opening extending therethrough, a rigid force transferring member having an opening extending therethrough and a fastener, said expansion member positioned against one end of said level sensor means, said force transferring member positioned against said expansion member, said level sensor means, said expansion means, and said force transferring member being provided with means to insure against relative lateral rotation, said fastener placed through said openings and attached to said liquid level sensor means causing as it is tightened movement of said force transferring member toward said level sensor means thus causing a peripheral expansion of said expansion member so that a friction fit is set up between said expansion member and the interior surface of the inner electrode of said probe measuring means.

3. In liquid gaging apparatus, the combination comprising a capacitive probe liquid quantity measuring device, having an inner and an outer cylindrical electrode, a liquid level sensor assembly adapted to be located at any position within the inner electrode of said measuring device, a positioning device for said level sensor assembly operatively connected to said liquid level sensor assembly and movable therewith, said positioning device comprising a rubber-like expansion member having an opening extending therethrough, a rigid force transferring member having an opening extending therethrough and a screw fastener, said expansion member positioned against one end of said level sensor, said force transferring member positioned against said expansion member, said end of said level sensor, said expansion member, and said force transferring member being provided with groove and slot arrangement to insure against relative rotation between the forementioned members, said screw fastener placed through said openings and attached to said liquid level sensor assembly, tightening of said fastener causing a movement of said force transmitting member toward said level sensor assembly and thus causing a peripheral expansion of said expansion member so that a friction connection is set up between the expansion member and the interior surface of the inner electrode of said measuring device, said force transferring member having a portion that can be held by a tool to inhibit rotation of said level sensor assembly and said positioning device as the fastener is adjusted.

4. In combination, a capacitive type liquid level probe having an inner and outer concentric cylindrical electrodes, a liquid level sensor and means mounting said sensor adjustably within the inner electrode of said probe, said means including an expansible member adapted to expand providing a friction fit between said member and said inner electrode.

5. Apparatus of the class described comprising, in combination: a tubular member; first means adapted to be located at any desired position entirely within said tubular member, said first means including a resilient portion capable of being expanded to provide a friction fit between said resilient portion and said tubular member; and second means cooperating with said first member and including a first portion holding said first means to prevent rotation thereof and a second portion operable to cause expansion of said resilient means, said second means being removable thereafter without further affecting said resilient means.

References Cited in the file of this patent

UNITED STATES PATENTS

| | | |
|---|---|---|
| 874,836 | Dodge et al. | Dec. 24, 1907 |
| 1,303,091 | Mack | May 6, 1919 |
| 1,960,923 | Ricker | May 29, 1934 |
| 2,498,232 | Andrews | Feb. 21, 1950 |
| 2,560,757 | Bowar | July 17, 1951 |
| 2,604,170 | Leffler | July 22, 1952 |
| 2,614,770 | Gabrielson | Oct. 21, 1952 |

FOREIGN PATENTS

| | | |
|---|---|---|
| 1,082,713 | France | June 23, 1954 |